United States Patent
Boyum et al.

(10) Patent No.: US 10,344,511 B2
(45) Date of Patent: Jul. 9, 2019

(54) HINGE DAMPER

(71) Applicant: HEWLETT-PACKARD DEVELOPMENT COMPANY, L.P., Houston, TX (US)

(72) Inventors: Gerald Boyum, Vancouver, WA (US); Lynn A Collie, Vancouver, WA (US); Kevin Lo, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/331,288

(22) Filed: Oct. 21, 2016

(65) Prior Publication Data

US 2018/0112450 A1   Apr. 26, 2018

(51) Int. Cl.
    *E05D 11/08*   (2006.01)
    *H04N 1/00*    (2006.01)

(52) U.S. Cl.
    CPC ............ *E05D 11/082* (2013.01); *E05D 11/08* (2013.01); *E05D 11/084* (2013.01); *E05D 2011/085* (2013.01); *H04N 1/00519* (2013.01)

(58) Field of Classification Search
    CPC ..... E05D 11/08; E05D 11/082; E05D 11/084; E05D 2011/085; E05D 5/10; E05D 5/14; E05D 5/16; E05D 2005/145
    USPC ........................................ 16/337, 341, 342
    See application file for complete search history.

(56) References Cited

U.S. PATENT DOCUMENTS

| | | | | |
|---|---|---|---|---|
| 673,000 | A * | 4/1901 | Dyer ..................... | E05D 11/082 16/342 |
| 684,074 | A * | 10/1901 | Luppert ................ | E05D 11/082 16/342 |
| 3,239,874 | A * | 3/1966 | Sperzel ................. | E05D 11/082 16/338 |
| 4,838,111 | A * | 6/1989 | Schmidt ................. | E05C 17/30 16/337 |
| 4,891,862 | A * | 1/1990 | Holan ................. | E05D 11/1014 16/278 |
| 4,964,193 | A * | 10/1990 | Rommelfaenger ... | E05D 11/082 16/225 |
| 5,052,078 | A * | 10/1991 | Hosoi ................... | G06F 1/1616 16/297 |
| 5,081,743 | A * | 1/1992 | Mayes .................... | E05D 15/44 16/341 |
| 5,491,874 | A * | 2/1996 | Lowry ................. | G06F 1/1616 16/337 |
| 5,609,421 | A * | 3/1997 | Schulze-Eyssing .... | F16C 11/02 384/125 |

(Continued)

*Primary Examiner* — Jeffrey O'Brien
(74) *Attorney, Agent, or Firm* — HP Inc. Patent Department

(57) ABSTRACT

An example device includes a first member, a second member, and a hinge. The hinge pivotably couples the first member to the second member. The hinge includes a damper. The damper includes core, and the core has a lobed portion. In another example, a device includes a first mounting member, a second mounting member, a first connector pivotably coupled to the first mounting member at a first hinge and to the second mounting member at a second hinge, a second connector pivotably coupled to the first mounting member at a third hinge and to the second mounting member at a fourth hinge, and a damper positioned at least at one of the first hinge, second hinge, third hinge or the fourth hinge, the damper including core with lobed portion.

8 Claims, 3 Drawing Sheets

(56) References Cited

U.S. PATENT DOCUMENTS

| | | | | |
|---|---|---|---|---|
| 5,645,308 A * | 7/1997 | Fink | B60J 3/0239 | 16/334 |
| 5,664,290 A * | 9/1997 | Scherrer | E05D 3/06 | 16/287 |
| 5,682,645 A * | 11/1997 | Watabe | G06F 1/1616 | 16/338 |
| 5,820,197 A * | 10/1998 | Lanser | B60J 3/0265 | 296/97.12 |
| 5,918,348 A * | 7/1999 | Carpenter | G06F 1/1616 | 16/342 |
| 5,967,587 A * | 10/1999 | Collet | B60J 3/0239 | 16/342 |
| 6,035,491 A * | 3/2000 | Hartigan | G06F 1/1616 | 16/336 |
| 6,085,388 A * | 7/2000 | Kaneko | G06F 1/1616 | 16/274 |
| 6,230,365 B1 * | 5/2001 | Lu | G06F 1/1616 | 16/16 |
| 6,349,449 B1 * | 2/2002 | Kuehl | E05D 11/084 | 16/332 |
| 6,438,798 B1 * | 8/2002 | Chene | G02C 5/2254 | 16/284 |
| 6,470,532 B2 * | 10/2002 | Rude | G06F 1/1616 | 16/313 |
| 6,499,189 B2 * | 12/2002 | Kondo | E05D 3/06 | 16/239 |
| 6,718,595 B1 * | 4/2004 | Berger, Jr. | E05D 5/14 | 16/273 |
| 6,871,384 B2 * | 3/2005 | Novin | B60R 11/0235 | 16/337 |
| 6,889,404 B2 * | 5/2005 | Lu | E05D 3/14 | 16/287 |
| 7,124,473 B2 * | 10/2006 | Lu | G06F 1/1616 | 16/337 |
| 7,377,012 B2 * | 5/2008 | Lu | G06F 1/1616 | 16/342 |
| 7,382,998 B2 | 6/2008 | Murrell | | |
| 7,584,525 B2 * | 9/2009 | Chern, Jr. | G06F 1/1616 | 16/342 |
| 7,769,322 B2 | 8/2010 | Ishihara et al. | | |
| 7,797,796 B2 * | 9/2010 | Migli | E05D 15/46 | 16/286 |
| 7,891,055 B1 * | 2/2011 | Combs | E05D 11/084 | 16/341 |
| 7,958,600 B2 * | 6/2011 | Kuo | G06F 1/1616 | 16/342 |
| 8,245,356 B2 * | 8/2012 | Chu | G06F 1/1681 | 16/342 |
| 8,402,609 B2 * | 3/2013 | Chien | E05D 11/1014 | 16/342 |
| 8,448,297 B2 * | 5/2013 | Chen | E05D 5/14 | 16/342 |
| 8,555,465 B2 * | 10/2013 | Novin | E05D 3/02 | 16/342 |
| 8,631,542 B2 * | 1/2014 | Chen | E05D 11/082 | 16/319 |
| 8,689,404 B2 * | 4/2014 | Hsu | G06F 1/1681 | 16/337 |
| 8,875,348 B2 * | 11/2014 | Kossett | G06F 1/1681 | 16/342 |
| 8,935,829 B2 * | 1/2015 | Oshima | E05D 7/086 | 16/286 |
| 8,959,716 B2 * | 2/2015 | Hsu | E05D 3/06 | 16/302 |
| 9,609,770 B2 * | 3/2017 | Ju | H05K 5/0226 | |
| 9,644,412 B2 * | 5/2017 | Novin | E05D 3/02 | |
| 9,790,720 B2 * | 10/2017 | Jenum | E05D 11/082 | |
| 2002/0073508 A1 * | 6/2002 | Rude | G06F 1/1616 | 16/341 |
| 2003/0200626 A1 * | 10/2003 | Kosako | E05D 11/082 | 16/337 |
| 2006/0272128 A1 * | 12/2006 | Rude | E05D 11/084 | 16/342 |
| 2006/0285916 A1 * | 12/2006 | Lu | G06F 1/1616 | 403/119 |
| 2007/0192994 A1 * | 8/2007 | Chuang | G06F 1/1616 | 16/342 |
| 2008/0010777 A1 | 1/2008 | Katsumata et al. | | |
| 2008/0022492 A1 * | 1/2008 | Lee | E05D 11/02 | 16/337 |
| 2009/0038119 A1 * | 2/2009 | Rude | G06F 1/1616 | 16/342 |
| 2009/0165248 A1 * | 7/2009 | Wang | E05D 11/082 | 16/339 |
| 2010/0205777 A1 * | 8/2010 | Kim | E05D 11/0081 | 16/386 |
| 2010/0287732 A1 * | 11/2010 | Fang | G06F 1/1675 | 16/250 |
| 2011/0107556 A1 * | 5/2011 | Wang | G06F 1/1616 | 16/382 |
| 2012/0117761 A1 * | 5/2012 | Lambert | E05D 15/30 | 16/380 |
| 2012/0237257 A1 | 9/2012 | Tomino et al. | | |
| 2013/0031749 A1 * | 2/2013 | Hsu | G06F 1/1681 | 16/381 |
| 2014/0026364 A1 * | 1/2014 | Hsu | E05D 5/04 | 16/333 |
| 2014/0310915 A1 * | 10/2014 | Tung | E05D 11/082 | 16/342 |
| 2015/0267451 A1 * | 9/2015 | Hirai | E05D 3/02 | 16/279 |
| 2015/0286255 A1 * | 10/2015 | Hamel | G06F 1/1681 | 312/327 |
| 2016/0159588 A1 | 6/2016 | Mizuguchi | | |

* cited by examiner

HINGE DAMPER

BACKGROUND

Many devices, such as imaging systems like printers, generally include access panels or doors. The panels or doors allow access to internal components for maintenance purposes, for example. The panels or doors may be either completely removable or may be connected to the body of the device with hinges. The hinges allow the panel or door to be opened while remaining attached to the body of the device.

BRIEF DESCRIPTION OF THE DRAWINGS

For a more complete understanding of various examples, reference is now made to the following description taken in connection with the accompanying drawings in which.

DETAILED DESCRIPTION

Various examples described herein provide for hinges with a damping mechanism. The example hinges may be used for access doors or panels for imaging devices, for example. The damping mechanism in the example hinges includes a core with a lobe and a sleeve surrounding the core. As the door is opened, a first member of the hinge pivotably rotates relative to a second member about the hinge coupled to each portion. During the rotation, the lobed core forces the sleeve against either the first or second member, resulting in a resistance to the rotation.

As described above, devices such as imaging systems, including printers, generally include access panels or doors that may be opened to allow access to internal components for maintenance purposes, for example. In various examples, hinges allow the panel or door to be opened while remaining attached to the body of the device. Conventional hinges may cause the door to be difficult to control during opening and closing due to the weight of the door. Further, conventional hinges may cause the door to produce a slamming or bouncing movement, for example.

Accordingly, the present disclosure describes example devices and systems with hinges which include a damping mechanism. The example damping mechanisms may facilitate opening or closing of the hinged device with a gradual motion, for example.

Figure 2:
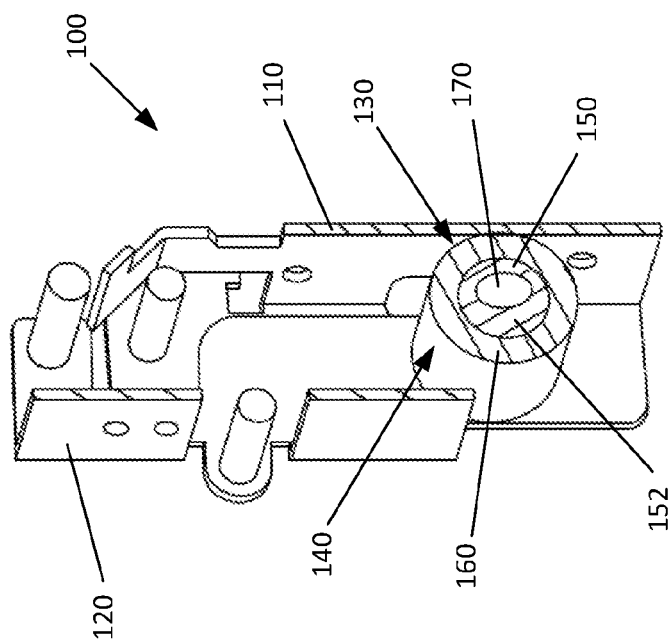
FIG. 2 is an illustration of the example device of FIG. 1 in a closed position.
Figure 1:
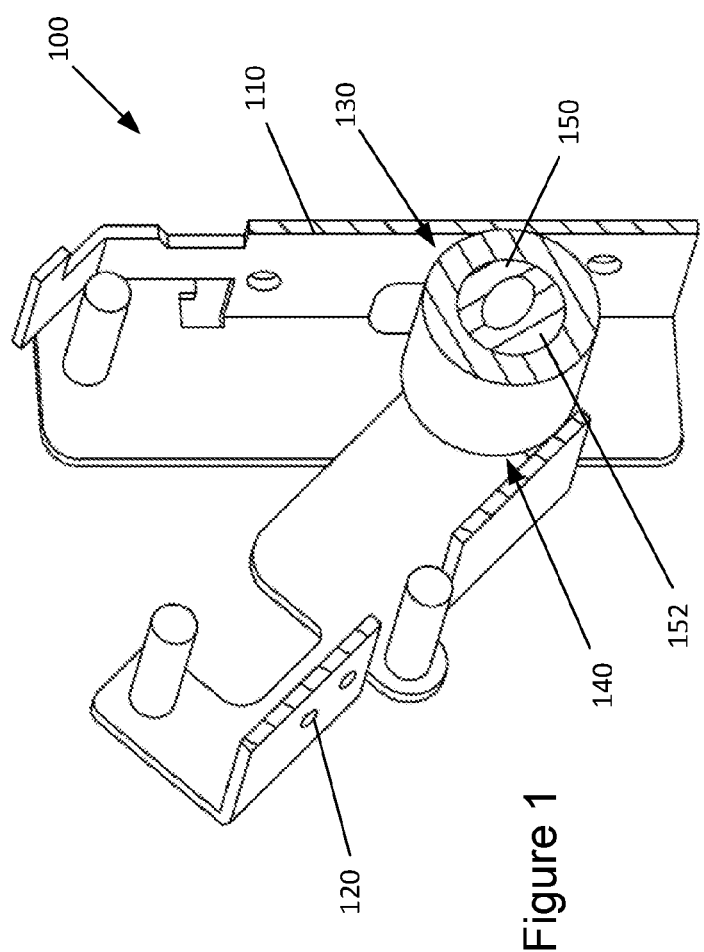
FIG. 1 is an illustration of an example device in an open position.

Referring now to the figures, FIGS. 1 and 2 illustrate an example device with a hinge that includes a damper. In this regard, FIG. 1 illustrates the example device 100 in an open position, and FIG. 2 illustrates the example device 100 in a closed position. The example device of FIG. 1 includes a first member 110 and a second member 120. Each member 110, 120 may be formed of a variety of materials including, but not limited to, metal or plastic. In one example, the first member 110 and the second member 120 are formed of sheet metal.

The example device 100 includes a hinge 130 which pivotably couples the first member 110 to the second member 120. In this regard, the first member 110 and the second member 120 may pivot, or rotate, relative to each other about the hinge 130. An example hinge is described in greater detail below with reference to FIG. 5.

In the example of FIGS. 1 and 2, the example hinge 130 includes a damper 140. In the example of FIGS. 1 and 2, the damper 140 includes a core 150 with a lobed portion 152. In various examples, the core 150 may be formed of a hardened material, such as a hard plastic or a metal. The lobed portion 152 is formed as, for example, a bulge on one portion of the core 150. Thus, the core 150 may have a non-circular outer surface or may be non-symmetrical with respect to an axis of rotation.

The lobed portion 152 is positioned to cause an increase in resistance to the pivoting as the device 100 is opened. For example, as the second member 120 is rotated relative to the first member 110 from the closed position illustrated in FIG. 2 to the open position in FIG. 1, the lobed portion 152 may cause an increase in resistance to the opening.

As illustrated in FIG. 2, the damper 140 of the hinge 130 includes a sleeve 160 formed around the core 150. The sleeve 160 may be formed of an elastomer such as rubber, for example. In one example, the sleeve 160 and the core 150 are rotatable relative to each other. For example, as the first member 110 and the second member 120 pivot relative to each other about the hinge 130, the core 150 may rotate with the second member 120, while the sleeve 160 remains stationary relative to the first member 110. In this regard, the example hinge 130 illustrated in FIG. 2 includes an axle 170 which may be coupled to the second member 120. The axle 170 may be keyed to an inner opening of the core 150, causing the core to rotate with the axle 170.

Thus, in one example, during pivoting of the first member 110 relative to the second member 120 about the hinge 130, the lobed portion 152 of the core 150 causes an increase in pressure between the sleeve 160 and the first member 110. The increased pressure provides a dampening of the rotation or pivoting. In this regard, the lobed portion 152 may be positioned to provide the dampening at a desired point during the pivoting of the first member 110 relative to the second member 120 about the hinge 130.

In various examples, the first member 110 may be mounted to the frame of an apparatus, while the second member 120 is mounted to a door of the apparatus. Thus, the door may be hinged to the frame, and the device 100 may allow the door to be opened. The damper 140 of the hinge 130 may provide the door to be opened in a smooth manner, for example.

Figure 4:
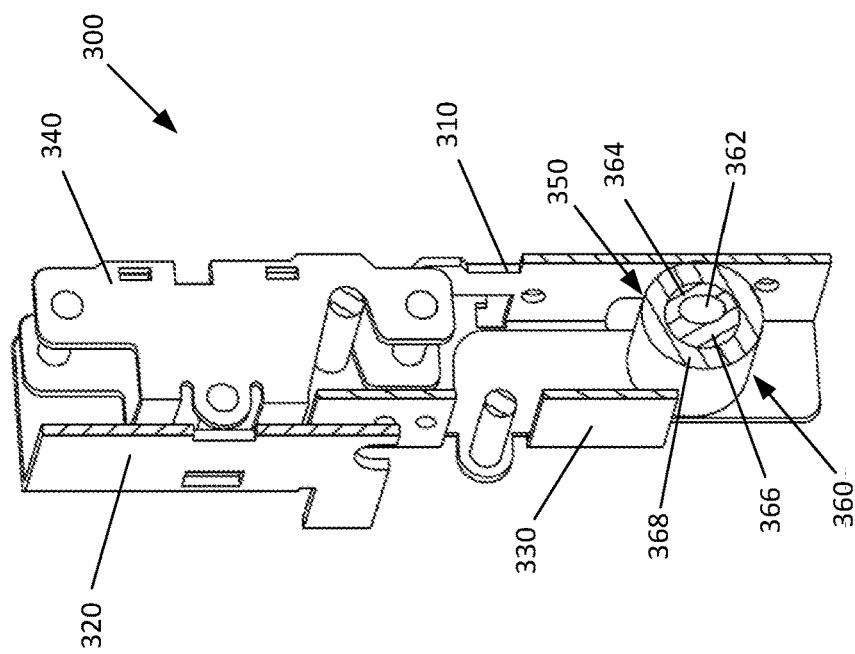
FIG. 4 is an illustration of the example device of FIG. 3 in a closed position.
Figure 3:
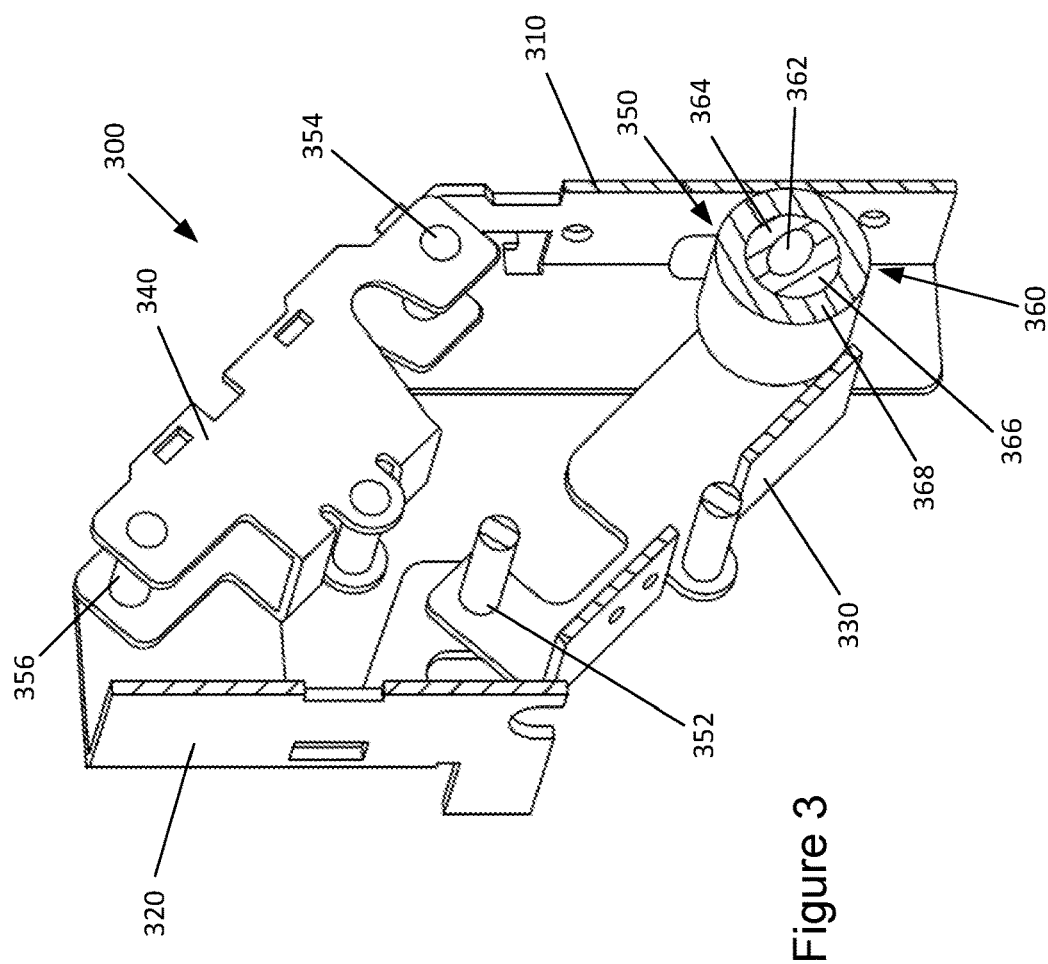
FIG. 3 is an illustration of another example device in an open position.

Referring now FIGS. 3 and 4, another example device 300 is illustrated with a hinge that includes a damper. In this regard, FIG. 3 illustrates the example device 300 in an open position, and FIG. 4 illustrates the example device 300 in a closed position. The example device of FIGS. 3 and 4 includes a first mounting member 310 and a second mounting member 320. In the example of FIGS. 3 and 4, the first mounting member 310 and the second mounting member 320 are substantially parallel to each other in both the open position (FIG. 3) and the closed position (FIG. 4).

The first mounting member 310 and the second mounting member 320 of the example device 300 of FIGS. 3 and 4 are each pivotably coupled to a first connector 330 and a second connector 340. As illustrated most clearly in FIG. 3, the first connector 330 is pivotably coupled to the first mounting member 310 at a first hinge 350, and the first connector 330 is pivotably coupled to the second mounting member 320 at a second hinge 352. Similarly, the second connector 340 is pivotably coupled to the first mounting member 310 at a third hinge 354, and the second connector 340 is pivotably coupled to the second mounting member 320 at a fourth hinge 356.

In various examples, the example device 300 may be provided with a damper that is positioned at least at one of the hinges 350, 352, 354, 356. For purposes of clarity, FIGS. 3 and 4 illustrate a damper 360 positioned at the first hinge 350 at which the first mounting member 310 is pivotably coupled to the first connector 330. The damper 360 is similar to the damper 140 described above with reference to FIGS. 1 and 2 and includes a core 364 with a lobed portion 366.

As illustrated in FIGS. 3 and 4, the example damper 360 includes an axle 362 coupled to the first connector 330. The axle 362 is keyed to the core 364 such that the core 364 moves with the axle 362 and, therefore, the first connector 330. In the example of FIGS. 3 and 4, the core 364 with the lobed portion 366 is covered with a sleeve 368. As noted above, the core 364 may be formed of a hardened material, while the sleeve 368 is formed of an elastomer, such as rubber. The core 364 and the sleeve 368 may be rotatable relative to each other.

The lobed portion 366 of the core 364 is positioned to cause an increase in resistance to the pivoting of the first connector 330 relative to the first mounting member 310. For example, as the first connector 330 is rotated relative to the first mounting member 310 from the closed position illustrated in FIG. 4 to the open position in FIG. 3, the lobed portion 366 may cause an increase in resistance to the opening.

As noted above, the axle 362 is coupled to the first connector 330 and is keyed to the core 364. Thus, as the first connector 330 and the first mounting member 310 pivot relative to each other about the first hinge 350, the core 364 may rotate with the first connector 330, while the sleeve 368 remains stationary relative to the first mounting member 310. Thus, as described above, during pivoting of the first connector 330 relative to the first mounting member 310 about the first hinge 350, the lobed portion 366 of the core 364 causes an increase in pressure between the sleeve 368 and the first mounting member 310.

In the example device 300 of FIGS. 3 and 4, the first connector 330 and the second connector 340 are coupled to the first mounting member 310 and the second mounting member 320 such that the first mounting member 310 and the second mounting member 320 remain substantially parallel to each other during the opening and closing of the example device 300. Thus, the first connector 330 and the second connector 340 are coupled to the first mounting member 310 and the second mounting member 320 to maintain the first mounting member 310 parallel to the second mounting member 320 during pivoting of the first connector 330 and the second connector 340 relative to the first mounting member 310 and the second mounting member 320.

In various examples, the first mounting member 310 may be mounted to the frame of an apparatus, while the second mounting member 320 is mounted to a door of the apparatus. Thus, the door may be hinged to the frame, and the device 300 may allow the door to be opened. The damper 360 of the first hinge 350 may provide the door to be opened in a smooth manner, for example. Further, the use of the example hinge 300 allows the door to remain parallel to the frame, or allows the door in the open position to be parallel to the door in the closed position. As example of such an apparatus is described below with reference to FIG. 6.

Figure 5:
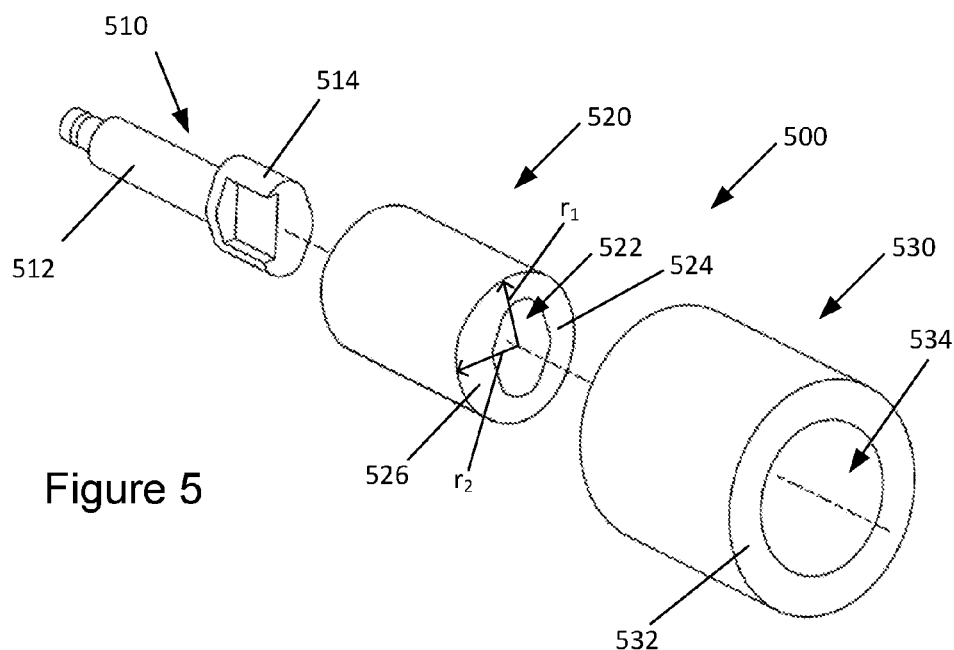
FIG. 5 is an exploded view of an example hinge.

Referring now to FIG. 5, an example hinge with a damper is illustrated in an exploded view. The example hinge 500 includes an axle 510, a core 520 and a sleeve 530. As described above, the axle 510 may be coupled to one member of a hinge device. In this regard, the axle 510 includes an axial portion 510 which may extend from the member to which it is coupled. The axle 510 further includes a keyed portion 514. In various examples, the keyed portion may have various non-circular configurations.

The keyed portion 514 of the example hinge 510 is sized and shaped to engage an inner opening 522 of the core 520. Thus, a rotation of the axle 510 causes a rotation of the core 520. The core 520 is formed with a body 524 that is rigid and may be formed of a hardened material such as metal or molded plastic, for example. As noted above, the body 524 of the core 520 includes a lobed portion 526. Thus, the core 520 has an outer surface that may be non-circular or asymmetrical about a central axis 599. For example, in the example of FIG. 5, the lobed portion 526 of the example core 520 has a radius $r_2$ that is greater than the radius $r_1$ at a different portion of the core 520.

The example core 520 illustrated in FIG. 5 may be provided with lubrication on the outer surface of the body 524 to facilitate rotation of the core 520 within the sleeve 530. In this regard, the sleeve 530 includes a sleeve body 532 formed around an inner opening 534. The inner opening 534 is sized to accommodate the core 520 therein. As noted above, the sleeve 530 is formed of an elastomer such as rubber. Thus, as the core 520 rotates within the sleeve body 532, the shape of the sleeve body 532 may change to conform to the lobed portion 526 of the core rotating therein.

Figure 6:
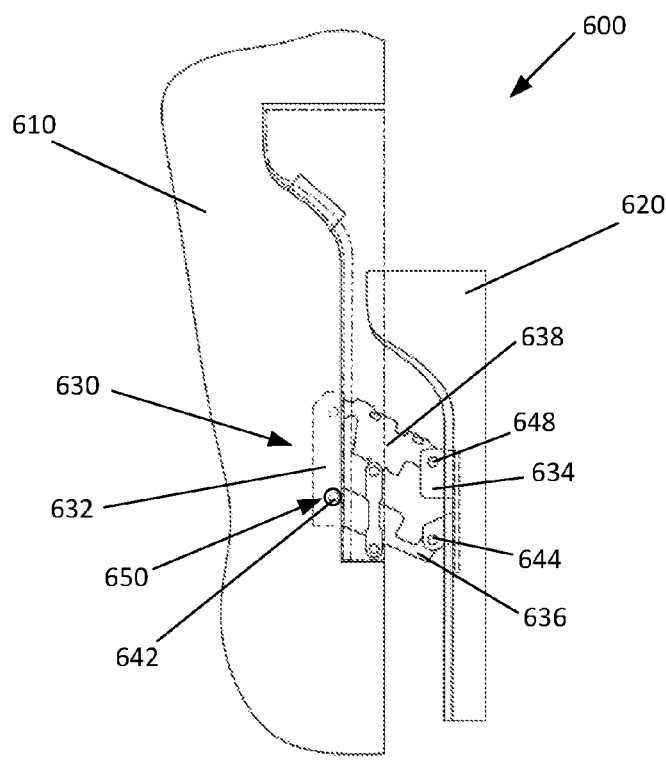
FIG. 6 is an illustration of an example apparatus with an example hinge arrangement.

Referring now to FIG. 6, an example apparatus is illustrated with an example hinge arrangement. The example apparatus 600 includes a frame 610 and a door 620. As noted above, the example apparatus 600 may be any of a variety of devices including, but not limited to, printers, for example. In this regard, the frame 610 may form the body of the printer, and the door 620 may be an access door or panel to allow, for example, maintenance of the printer. FIG. 6 illustrates the door 620 in the open position, with the door 620 in the closed position illustrated with a dotted outline.

The example apparatus 600 of FIG. 6 further includes a hinge arrangement 630. In the example of FIG. 6, the hinge arrangement 630 is similar to the example device 300 described above with reference to FIGS. 3 and 4. In this regard, the example hinge arrangement 630 includes a first mounting member 632 coupled to the frame 610 of the example apparatus 600. A second mounting member 634 is coupled to the door 620 of the example apparatus. As described above with reference to FIGS. 3 and 4, the example hinge arrangement 630 includes two connectors 636, 638 coupled to the first mounting member 632 and the second mounting member 634. In this regard, the first connector 636 is pivotably coupled to the first mounting member 632 at a first hinge 642 and to the second mounting member 634 at a second hinge 644. Similarly, the second connector 638 is pivotably coupled to the first mounting member 632 at a third hinge 646 and to the second mounting member 634 at a fourth hinge 648.

As described above with reference to FIGS. 3 and 4, the first connector 636 and the second connector 638 are coupled to the first mounting member 632 and the second mounting member 634 such that the first mounting member 632 and the second mounting member 634 remain substantially parallel to each other during the opening and closing of the example hinge arrangement 630. Accordingly, the door 620 to which the second mounting member 632 is coupled remains substantially parallel to the frame 610.

In the example apparatus 600 of FIG. 6, the example hinge arrangement 630 is provided with a damper 650 at the first hinge 642. The damper 50 may be similar to the damper 140, 360 and 500 described above with reference to FIGS. 1-5. In this regard, the damper 650 includes a core with a lobed portion (not shown in FIG. 6). Thus, the damper 650 may, for example, counter the effect of gravity as the door 620 is opened and moves downward. In this regard, as the door is opened and moves downward, the lobed portion of the damper 650 may increase resistance to the movement. Thus, the door may appear to move at a slow or constant rate as it is opened.

In the example of FIG. 6, a damper 650 is provided on a single hinge 642. In other examples, the hinge arrangement 630 may include additional dampers at additional hinges. Further, the door 620 may be attached to the frame 610 with multiple hinge arrangements 630.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A device, comprising:
   a first member;
   a second member; and
   a hinge pivotably coupling the first member to the second member, the hinge including:
      an axle coupled to the first member of the device, wherein the axle extends from the first member of the device and includes a non-circular keyed portion to receive a core of a damper, wherein the damper includes a sleeve covering the core, the core to rotate within the sleeve, and the core including:
         an inner opening corresponding to the non-circular keyed portion of the axle to cause the core to rotate with the axle; and
         an asymmetrical outer surface about a central axis, wherein the sleeve is formed of an elastomer to change shape to conform to the entire perimeter of the asymmetrical outer surface of the core; and
      a lobed portion, the lobed portion to form a bulge on one portion of the core and to cause an increase in pressure between the sleeve and the first member during pivoting.

2. The device of claim 1, wherein, during pivoting of the first member relative to the second member, the lobed portion causes an increase in resistance to the pivoting.

3. The device of claim 1, wherein, during pivoting of the first member relative to the second member, the core is to rotate with the second member and the sleeve is to remain stationary relative to the first member.

4. A device, comprising:
   a first mounting member;
   a second mounting member;
   a first connector pivotably coupled to the first mounting member at a first hinge and to the second mounting member at a second hinge;
   a second connector pivotably coupled to the first mounting member at a third hinge and to the second mounting member at a fourth hinge; and
   a damper positioned about an axle of the first hinge wherein the axle extends from the first mounting member of the device and includes a non-circular keyed portion to receive a core of the damper, the core to rotate within a sleeve of the damper, the core including:
      an inner opening corresponding to the non-circular keyed portion of the axle to cause the core to rotate with the axle;
      an asymmetrical outer surface about a central axis, wherein the sleeve is formed of an elastomer to change shape to conform to the entire perimeter of the asymmetrical outer surface of the core; and
      a lobed portion to cause an increase in pressure between
   the sleeve and the first mounting member during pivoting about the axle.

5. The device of claim 4, wherein the first connector and the second connector are coupled to the first mounting member and the second mounting member to maintain the first mounting member parallel to the second mounting member during pivoting of the first connector and the second connector relative to the first mounting member and the second mounting member.

6. The device of claim 4, wherein, during pivoting of the first connector and the second connector relative to the first mounting member and the second mounting member, the lobed portion causes an increase in resistance to the pivoting.

7. An apparatus, comprising:
   a frame;
   a door; and
   a hinge arrangement, the hinge arrangement comprising:
      a first mounting member coupled to the frame;
      a second mounting member coupled to the door;
      a first connector pivotably coupled to the first mounting member at a first hinge and to the second mounting member at a second hinge;
      a second connector pivotably coupled to the first mounting member at a third hinge and to the second mounting member at a fourth hinge; and
      a damper positioned about an axle of at least at one of the first hinge, second hinge, third hinge or the fourth hinge, wherein the axle of the first hinge extends from the first mounting member and includes a non-circular keyed portion to receive a core of the damper, the core to rotate within a sleeve of the damper, the core including:
   an inner opening corresponding to the non-circular keyed portion of the axle to cause the core to rotate with the axle;
   an asymmetrical outer surface about a central axis, wherein the sleeve is formed of an elastomer to change shape to conform to the entire perimeter of the asymmetrical outer surface of the core; and
   a lobed portion to cause an increase in pressure between the sleeve and one of the first mounting member, the second mounting member, the first connector or the second connector during pivoting about the axle.

8. The apparatus of claim 7, wherein, during pivoting of the first connector and the second connector relative to the first mounting member and the second mounting member, the first mounting member is to remain parallel to the second mounting member.

\* \* \* \* \*